United States Patent
Möre

[15] 3,696,781
[45] Oct. 10, 1972

[54] ARRANGEMENT FOR METALLIZING OF PARTS OF A BODY

[72] Inventor: Oskar Wilhelm Möre, Enskede, Sweden

[73] Assignee: Telefonaktiebolaget LM Ericsson, Stockholm, Sweden

[22] Filed: Jan. 15, 1971

[21] Appl. No.: 106,826

[30] Foreign Application Priority Data

Feb. 5, 1970 Sweden .....................1490/70

[52] U.S. Cl.................................................118/425
[51] Int. Cl..................................................B05c 3/09
[58] Field of Search....118/421, 28, 29, 30, 400, 423, 118/425, 429; 22/39, 40; 156/345; 134/117, 191; 68/197; 117/113, 114, 117

[56] References Cited

UNITED STATES PATENTS

| | | |
|---|---|---|
| 1,971,104 | 8/1934 | Harter.............117/114 A UX |
| 2,771,047 | 11/1956 | Zimmerman..........118/421 X |
| 2,930,349 | 3/1960 | Jones......................118/429 X |
| 3,618,565 | 11/1971 | Taylor et al. ..............118/421 |

Primary Examiner—Morris Kaplan
Attorney—Hane, Baxley & Spiecens

[57] ABSTRACT

Apparatus for metallizing parts of a body by dipping into molten metal includes a plurality of part vessels or dip tanks with different heights and widths so chosen in accordance with the parts of the body to be metallized.

2 Claims, 3 Drawing Figures

INVENTOR
OSKAR WILHELM MÖRE

BY Hane, Baxley and
Mierro
ATTORNEYS

ARRANGEMENT FOR METALLIZING OF PARTS OF A BODY

The present invention relates to an arrangement for metallizing parts of a body by dipping into molten metal.

To cover metal parts of a body with a layer of another metal by dipping those parts into a molten metal, is a well established technique in the industry. Usually, in this connection, the components are dipped directly into a melting pot.

The parts of the body which are to be covered with metal must protrude further from the body than the parts which are not to be covered. With the above described method, it is not possible to prevent the coating of those parts of the body which protrude further than parts to be coated even if not desired.

This difficulty often arises in the electrical industry, for example, when one must solder a great number of soldering tags provided with hook-up wires in a terminal set.

An object of the invention is to eliminate this drawback. The characteristics of the invention appear from the appended claims.

Figure 1:
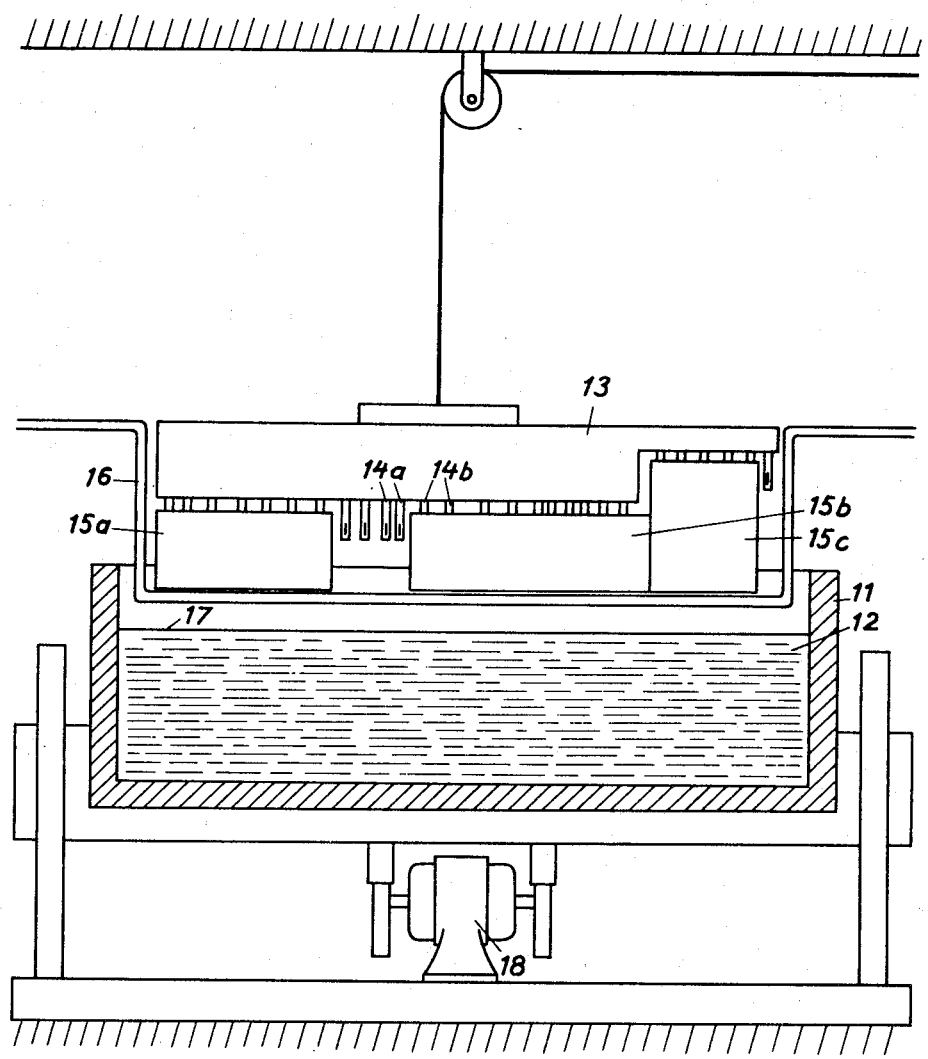
Figure 2:
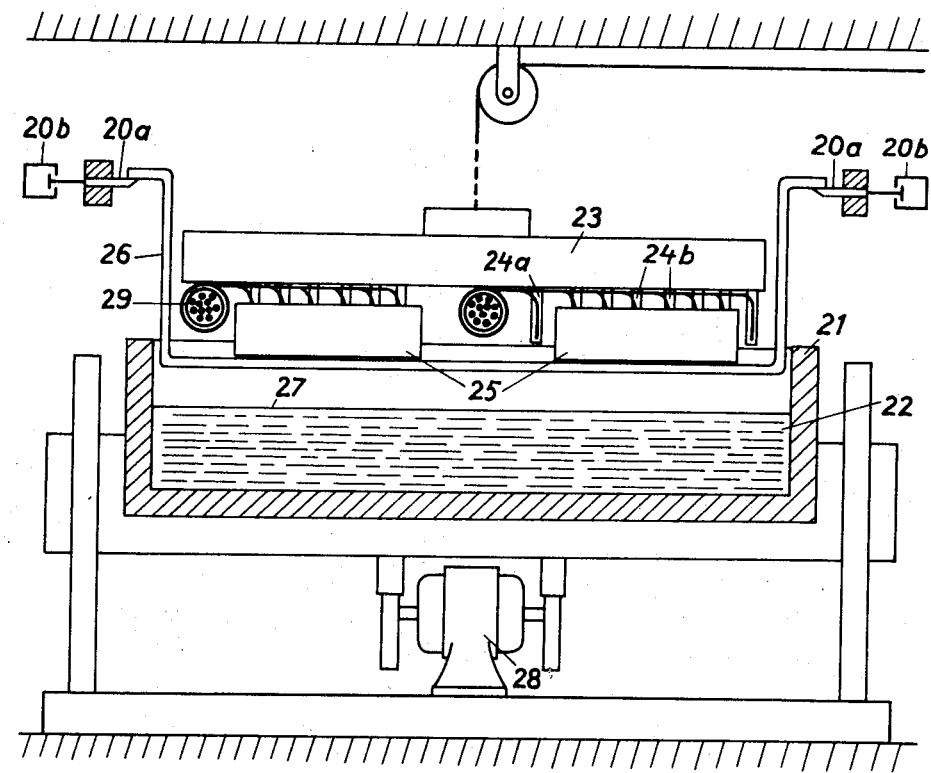
Figure 3:
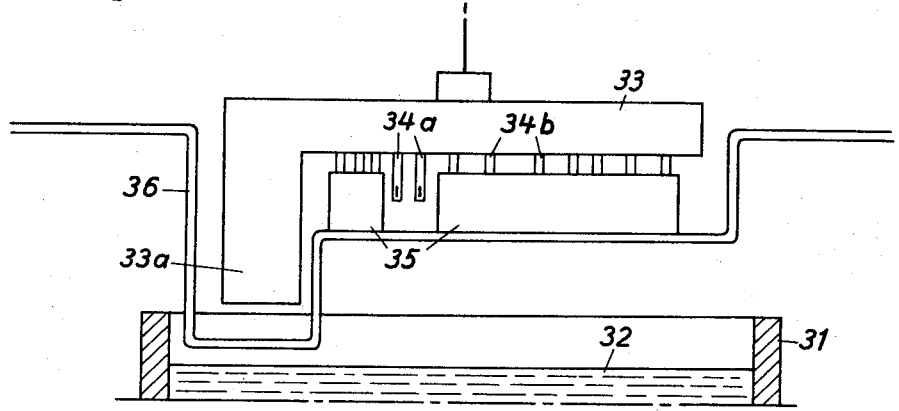

The invention will be described more in detail with reference to the accompanying drawing wherein:

FIGS. 1 and 2 show by way of example two different embodiments of an arrangement in accordance with the invention intended for dip brazing; and FIG. 3 shows a modification of a detail from FIGS. 1 and 2.

In FIG. 1, a reservoir tank or container contains molten tin 12. This container 11 is open at the top and provided with heating equipment in order to melt tin and then keep this tin in a molten condition. In addition, the container can be raised and lowered by means of, for example, a motor 18 or pneumatic or hydraulic cylinders.

A body 13 with soldering tags 14a, b is suspended over the container 11 in such a way that the body 13 can be raised and lowered. The dip tanks or vessels 15a, b, c in which the soldering tags 14a, b are to be dip brazed, are supported in a stand 16. Stand 16 is shaped and arranged so that when the container 11 is in its uppermost position, the vessels 15a, b, c in the stand will be completely below the surface 17 of the molten tin. When the container 11 is lowered, the vessels 15a, b, c will be filled to the brim with molten tin. The vessels 15a, b, c are so shaped that when the body 13 is then lowered, the vessels will surround only the soldering tags 14b which are to be soldered so that the tags are dipped sufficiently deep in the molten tin, while the soldering tags 14a which are not to be soldered, are outside any vessel.

Because certain vessels 15c are higher than other vessels 15a, b, there can be a simultaneous coating of tags which are situated on a higher level on the body 13.

FIG. 2 shows in the same way as in FIG. 1 a reservoir tank or container 21 filled with molten tin 22 which can be raised and lowered by means of, for example, a motor 28.

A body 23 with soldering tags 24a, b is suspended over the container 21 in such a way that the body 23 can be raised and lowered. The dip tanks or vessels 25 in which the soldering tags are to be dip brazed, are supported on a stand 26 shaped as described in connection with FIG. 1. However, the stand in this example is not fixed. In FIG. 2, slides 20a are arranged to reciprocate by the action of, for example, a pneumatic or hydraulic piston 20b.

In the figures the stand 26 is shown hanging on the slides 20a. If the container 21 now is raised so that the vessels 25 will rest on the bottom of the container, the slides 20a can, by means of the pistons 20b, be drawn aside, whereby the vessels 25 and the stand 26 will follow the container 21 down when the container 21 is lowered again. When the body 23 then is lowered, the soldering tags 24a, b will not touch the molten tin. However, if the slides 20a were not drawn aside the vessels 25 would remain in their upper position filled with tin when the container 21 was lowered, whereby dip brazing of the soldering tags 24b should have taken place. If several stands are placed in a row and supported on slides in this way, whereby in every stand one or several vessels for dip brazing are suspended, then the body with the soldering tags can be subdivided in part bodies so that certain vessels are arranged for every part body with the vessels supported on the same stand. The slides in which the stands are suspended can, in accordance with a predetermined program, be controlled so that certain stands with supported vessels in them will still be hanging in such a position that dip brazing of the soldering tags which belong to the corresponding part body takes place while other stands with other supported vessels will follow the tin container down, whereby dip brazing of the soldering tags for which the lowered vessels are intended, does not occur.

In larger terminals sets with many soldering tags the connection with hook-up wires often becomes very extensive. The hook-up wires are joined to cables, whereby those cables often are so thick that they will protrude further from the body than the soldering tags do. This makes dip brazing of the hook-up wires with conventional methods impossible. By modifying the vessels 25 so that they only surround the soldering tags 24b which are to be soldered and leave the cables 29 free, dip brazing is also in this case possible.

In FIG. 3 showing a detail from FIGS. 1 and 2, a container 31 contains molten tin 32. In this example, the body 33 with the soldering tags 34 is so constructed that certain parts 33a of the body have an outline located considerably lower than some of the soldering tags when the body is in a position for soldering. In this connection, the stand 36 in which the vessels 35 filled with molten tin are suspended, is suitably shaped so that it will substantially follow the lower outline of the body so that the depth of the vessels 35 can be reduced.

I claim:

1. Dip coating apparatus for the partial coating of a substrate whose bottom portion is non-uniform in vertical cross-section, comprising:
    a plurality of dip tanks, the open ends of which are disposed at different levels in accordance with said non-uniform configuration;
    a reservoir tank for coating material, normally disposed below and in alignment with said dip tanks and adapted for vertical movement;
    said reservoir tank being of a depth to fully receive said dip tanks therein;

means to vertically reciprocate said reservoir tank whereby said plurality of dip tanks may each be charged with coating material when the reservoir tank fully receives said dip tanks; and means to support and reciprocate said non-uniform configured substrate, with respect to said dip tanks, whereby selected areas of said non-uniform bottom portion may be coated.

2. Apparatus as in claim 1 wherein means releasably secure said dip tanks whereby when the reservoir tank is elevated said releasable means may be removed from a securing position whereby said dip tanks remain in and are carried by the reservoir tank.

* * * * *